`United States Patent Office`

2,704,757
Patented Mar. 22, 1955

2,704,757

5-HYDROXY-3,4,5,6-TETRAHYDROPYRIMIDINES

Clinton A. Dornfeld, Mundelein, Ill., assignor to G. D. Searle & Co., Chicago, Ill., a corporation of Illinois No Drawing. Application January 13, 1954,
Serial No. 403,901

6 Claims. (Cl. 260—251)

This invention relates to derivatives of 5-hydroxy-3,4,5,6-tetrahydropyrimidine and to processes for the preparation thereof. More particularly, this invention relates to compounds of the formula

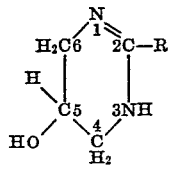

wherein R represents a benzyl, diphenylmethyl, or pyridyl radical.

Equivalent to compounds of the foregoing formula for the purposes of this invention are the non-toxic acid addition salts formed by interaction of the subject compounds with one equivalent of any of various inorganic and strong organic acids. These salts may be represented by the formula

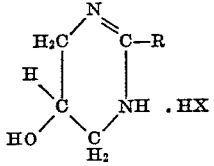

wherein R has the meaning hereinabove assigned and X is one equivalent of an anion—for example, chloride, bromide, iodide, methyl sulfate, ethyl sulfate, benzenesulfonate, toluenesulfonate, tartrate, succinate, malate, acetate, citrate, nitrate, sulfate, phosphate, sulfamate and the like—which, in combination with the cationic portion of a compound hereinafter claimed, is non-toxic in pharmaceutical dosage.

The compounds of this invention are valuable in medicine as cardioregulatory agents. Their capacity for exercising a depressant effect on the heart muscle commends their use in the treatment of auricular fibrillation and flutter, paroxysmal tachycardia, and divers other cardiac dysfunctions associated with rhythm changes of the heart caused by disturbances in the regular automaticity or conductance pattern of its beat.

It follows from the formulae and definitions above that among the substances comprising my invention are:

2-benzyl-5-hydroxy-3,4,5,6-tetrahydropyrimidine having the formula

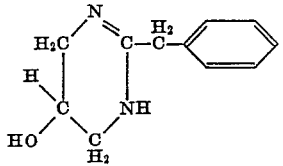

2-diphenylmethyl-5-hydroxy-3,4,5,6-tetrahydropyrimidine hydrochloride having the formula

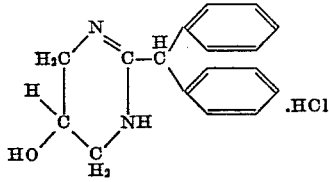

5-hydroxy-2-α-pyridyl-3,4,5,6-tetrahydropyrimidine having the formula

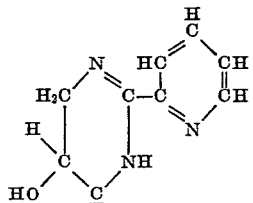

and 5-hydroxy-2-γ-pyridyl-3,4,5,6-tetrahydropyrimidine citrate having the formula

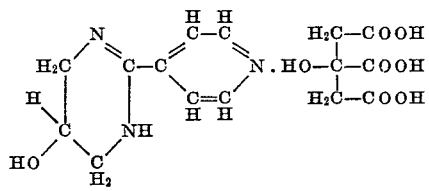

The amine bases comprehended by this invention are relatively insoluble in water but may be dissolved in dilute acids and in most of the common organic solvents. The acid addition salts of this invention are, on the other hand, readily soluble in water and in aqueous solutions of alcohols or other water-miscible organic solvents. The subject compounds may be administered in solid form as tablets or capsules; dissolved or suspended in aqueous media, they may be given parenterally.

The compounds to which this invention relates are conveniently prepared by condensing 1,3-diamino-2-propanol with an appropriate carboxylic acid (for example, phenylacetic acid, diphenylacetic acid, picolinic acid, nicotinic acid or isonicotinic acid) at temperatures of the order of 85° to 200° centigrade for periods of time ranging from 7 to 48 hours in the presence of a solvent such as xylene, ethyl benzene, cumene, cymene, or other inert organic solvent sufficiently high-boiling to permit use at convenient pressures. In a preferred operation of the processes of this invention, water formed during the course of the condensation is separated and removed—for example, by means of a mechanical separator.

The amine bases obtained by the foregoing procedure are converted to corresponding acid addition salts—as remarked above—by simple admixture with equivalent quantities of selected acids, the anionic portions of which conform with X as hereinbefore defined.

The following examples will illustrate in detail certain of the pyrimidine derivatives which constitute the present invention and methods which have been devised for their preparation  However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade (° C.), pressures in millimeters (mm.) of mercury, and relative amounts of materials in parts by weight, except as otherwise noted.

Example 1

2 - benzyl - 5 - hydroxy - 3,4,5,6 - tetrahydropyrimidine hydrochloride.—A mixture of 136 parts of phenylacetic acid, 136 parts of 1,3-diamino-2-propanol, and 435 parts of xylene is heated for 21 hours at reflux temperatures, using a separator to remove from the reaction mixture water formed in process. The xylene layer is separated from the 2-phase reaction product while the mixture is still hot. The residual non-solvent layer is washed with fresh xylene, following which approximately 800 parts of methyl ethyl ketone is added thereto, together with sufficient absolute ethanol (approximately 300 parts) to effect solution on heating. The hot solution is filtered; the filtrate crystallizes on cooling. The product thus obtained, 2 - benzyl - 5 - hydroxy - 3,4,5,6 - tetrahydropyrimidine, shows M. P. about 195° C. Conversion to the corresponding hydrochloric acid addition salt is achieved by reacting 10 parts of the base with 13 parts of a 27% solution of hydrogen chloride in absolute 2-propanol, using approximately 375 parts of a mixture of methyl ethyl ketone, ethanol, and 2-propanol as reaction solvents. The desired hydrochloride precipitates as a white crystalline solid from the reaction mixture. It melts at about 190° C.

*Example 2*

2 - diphenylmethyl - 5 - hydroxy - 3,4,5,6 - tetrahydropyrimidine hydrochloride.—A mixture of 106 parts of diphenylacetic acid, 68 parts of 1,3-diamino-2-propanol, and 215 parts of xylene is heated at reflux temperatures under a water separator for approximately 20 hours. Solvent is stripped from the reaction mixture at reduced pressures; and the residue is thereupon crystallized by pouring—with agitation—into approximately 325 parts of methyl ethyl ketone and subsequently cooling. The 2 - diphenylmethyl - 5 - hydroxy - 3,4,5,6 - tetrahydropyrimidine thus obtained shows M. P. 183–185° C. A 26.6-part portion of the base is converted to the hydrochloric acid addition salt upon treatment with 13 parts of a 27% absolute 2-propanol solution of hydrogen chloride, using a mixture of 120 parts of ethanol and 160 parts of 2-propanol as solvents for the reaction. The hydrochloride formed may be slow to crystallize. Seed crystals may be prepared by withdrawing a sample of the reaction mixture, adding a small amount of anhydrous ether thereto, and then manipulating to encourage crystallization—for example, by scratching. The crystals thus obtained may be used to seed the original reaction mixture. Pure 2-diphenylmethyl-5-hydroxy-3,4,5,6-tetrahydropyrimidine hydrochloride comes down as a white precipitate and shows M. P. 258–260° C.

*Example 3*

5-hydroxy-2-α-pyridyl-3,4,5,6-tetrahydropyrimidine hydrochloride.—A mixture of 62 parts of picolinic acid, 45 parts of 1,3-diamino-2-propanol, and 215 parts of xylene is heated at reflux temperatures for 17 hours, using a separator to remove water formed in process. Solvent is decanted from the insoluble reaction product, and the residue is then taken up in approximately 200 parts of 2-propanol at the boiling point. From this solution—on chilling—is precipitated 5-hydroxy-2-α-pyridyl-3,4,5,6-tetrahydropyrimidine, M. P. approximately 148° C. Dissolution of 14 parts of this base in approximately 55 parts of 2-propanol, followed by treatment with 11 parts of a 27% absolute 2-propanol solution of hydrogen chloride, causes precipitation—on chilling—of 5-hydroxy-2-α - pyridyl - 3,4,5,6 - tetrahydropyrimidine. hydrochloride. The product shows M. P. 196–199° C.

I claim:
1. A member of the group consisting of amine bases and their non-toxic acid addition salts, the formula of said bases being

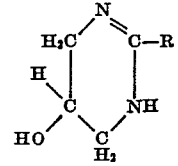

wherein R is selected from the group consisting of benzyl, diphenylmethyl, and pyridyl radicals.

2. 2-benzyl-5-hydroxy-3,4,5,6-tetrahydropyrimidine.
3. 2 - diphenylmethyl - 5 - hydroxy - 3,4,5,6 - tetrahydropyrimidine.
4. 5 - hydroxy - 2 - α - pyridyl - 3,4,5,6 - tetrahydropyrimidine.
5. In a process for preparing compounds of the formula wherein R is selected from the group consisting of benzyl, diphenylmethyl, and pyridyl radicals, and non-toxic acid addition salts thereof, the step which comprises reacting a member of the group consisting of phenylacetic acid, diphenylacetic acid, picolinic acid, nicotinic acid, and isoniotinic acid with 1,3-diamino-2-propanol at temperatures rangng from 85° to 200° centrigrade in the presence of an inert organic solvent, and isolating the product.

6. The process of claim 5 wherein the reaction temperature is between 110° and 150° centigrade and the solvent is xylene.

No references cited.